(No Model.) 15 Sheets—Sheet 1.
L. A. PECKHAM.
WOOL WASHING MACHINE.
No. 558,305. Patented Apr. 14, 1896.
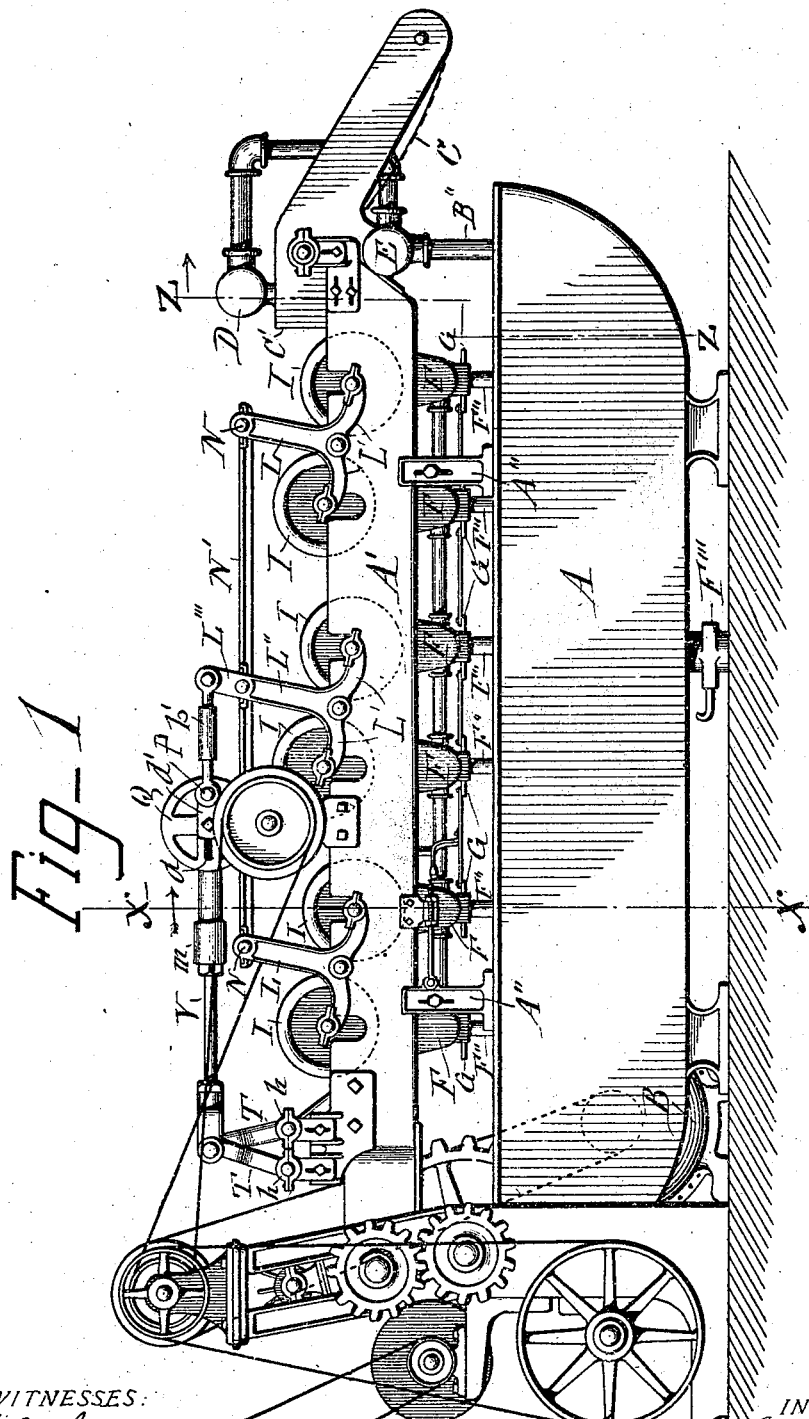
WITNESSES:
INVENTOR.
BY
his ATTORNEY.

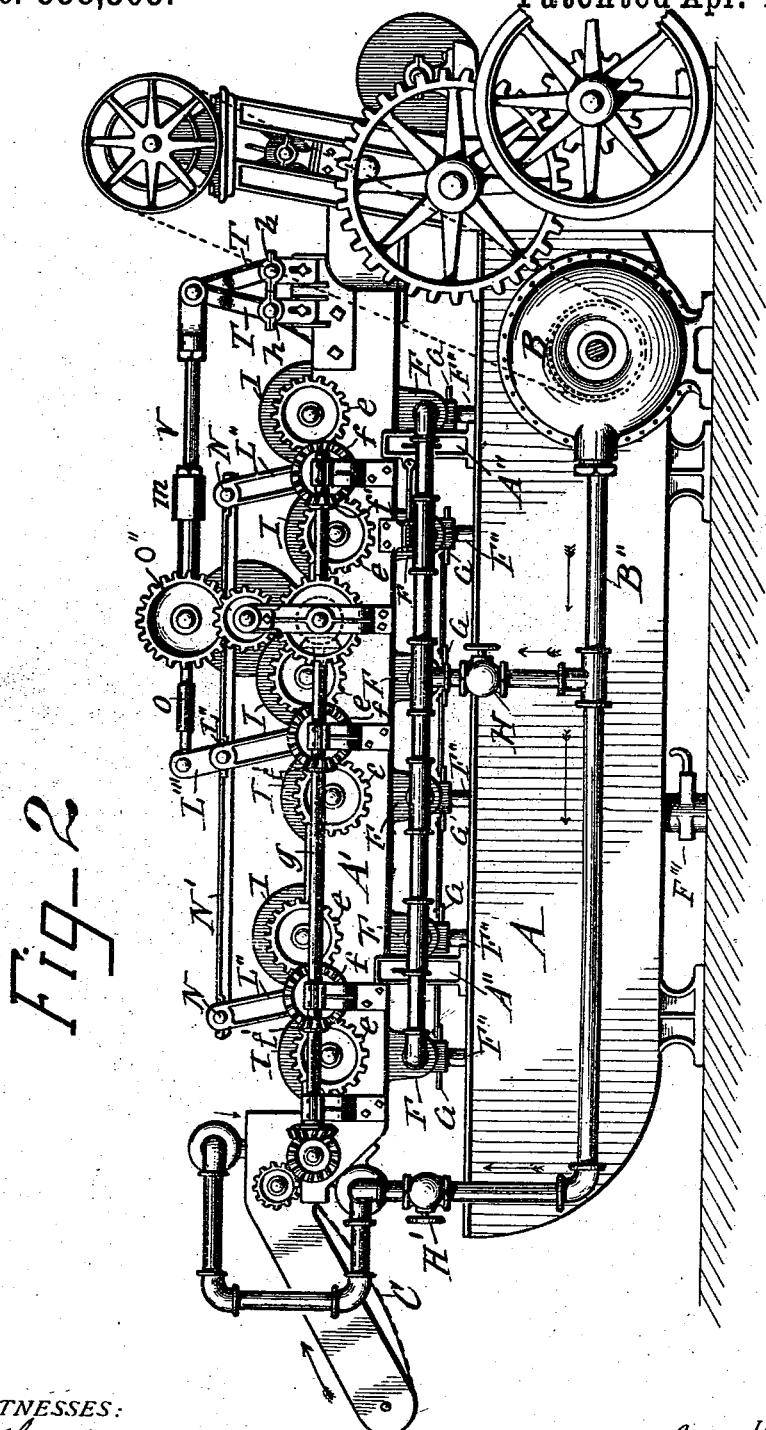

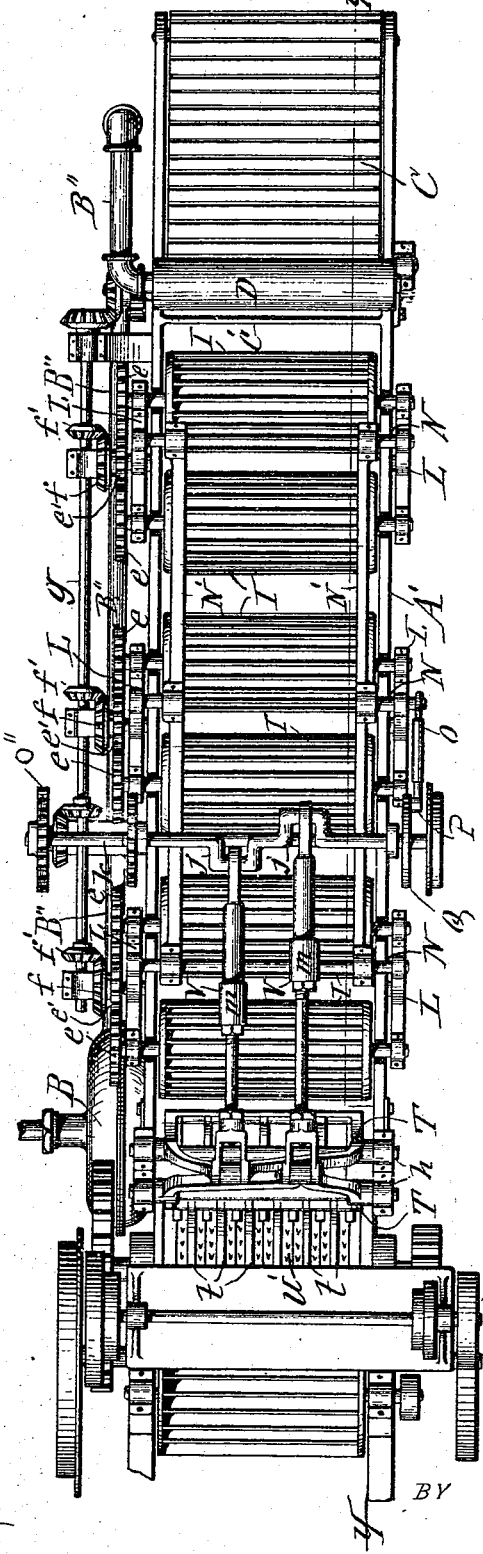

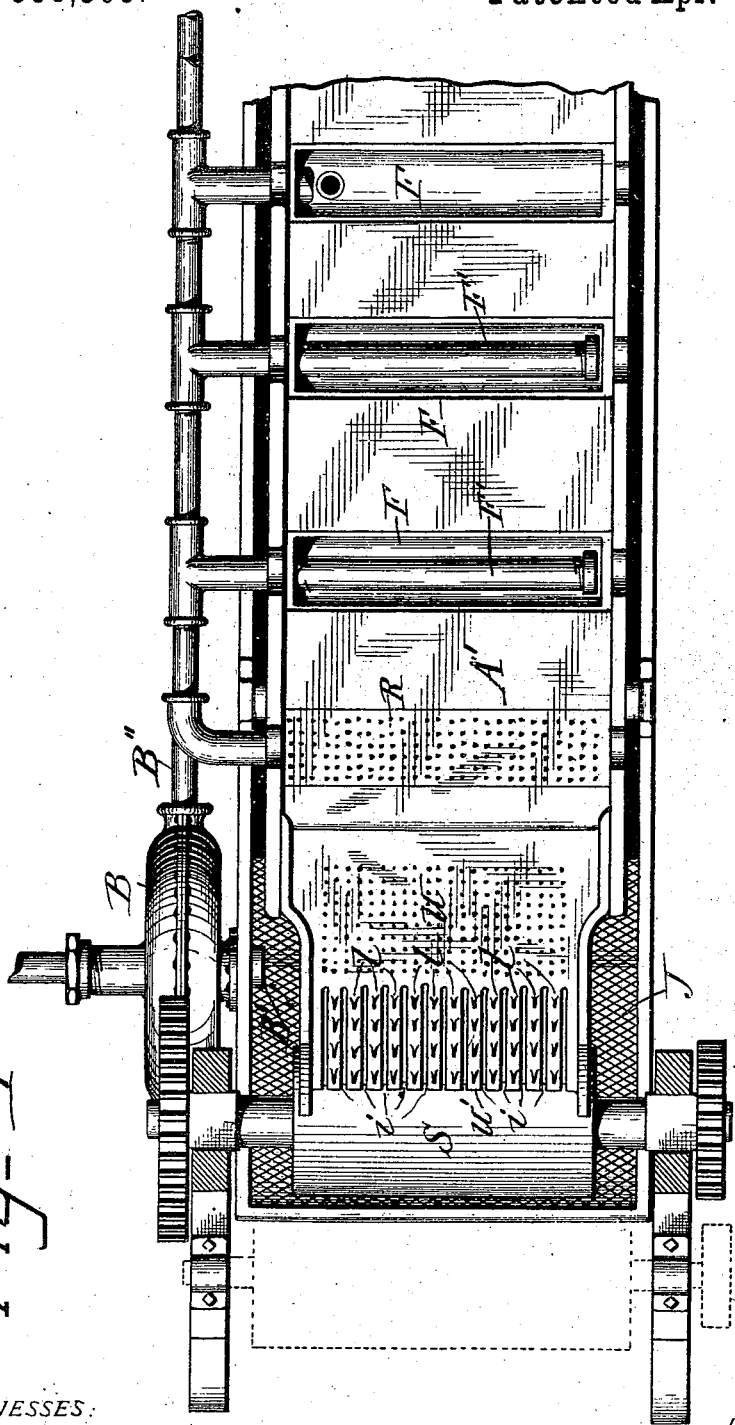

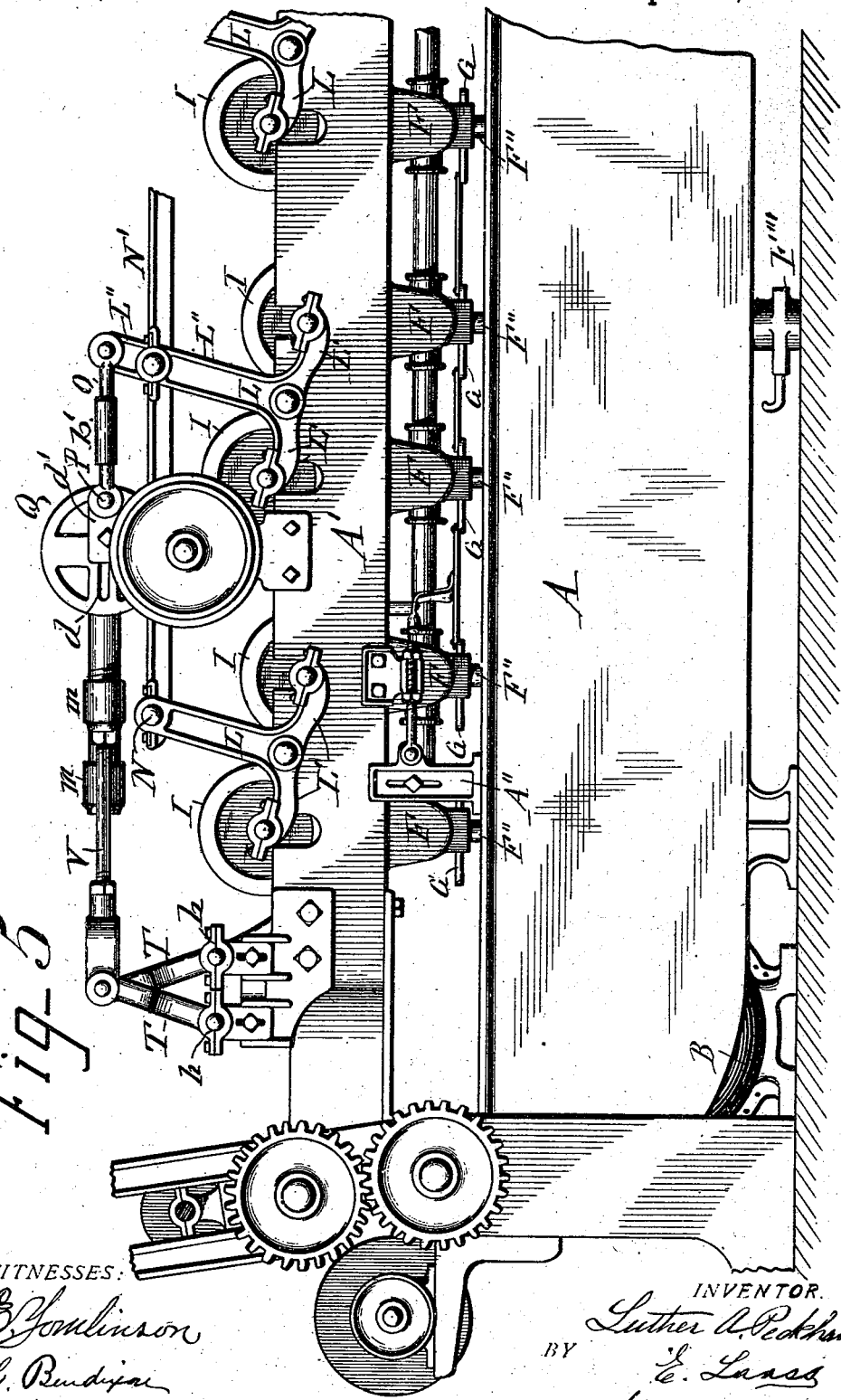

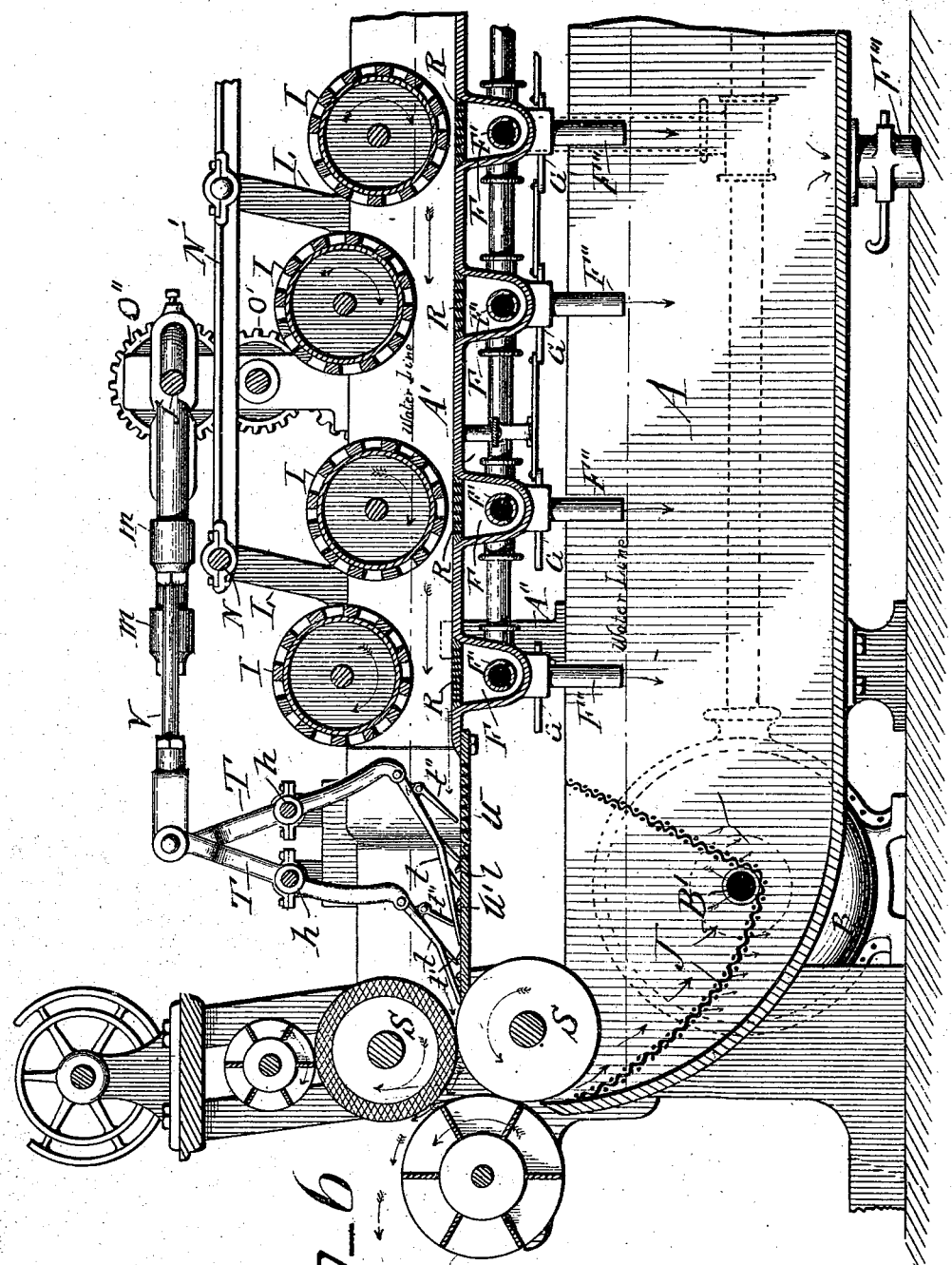

(No Model.) 15 Sheets—Sheet 7.
L. A. PECKHAM.
WOOL WASHING MACHINE.
No. 558,305. Patented Apr. 14, 1896.
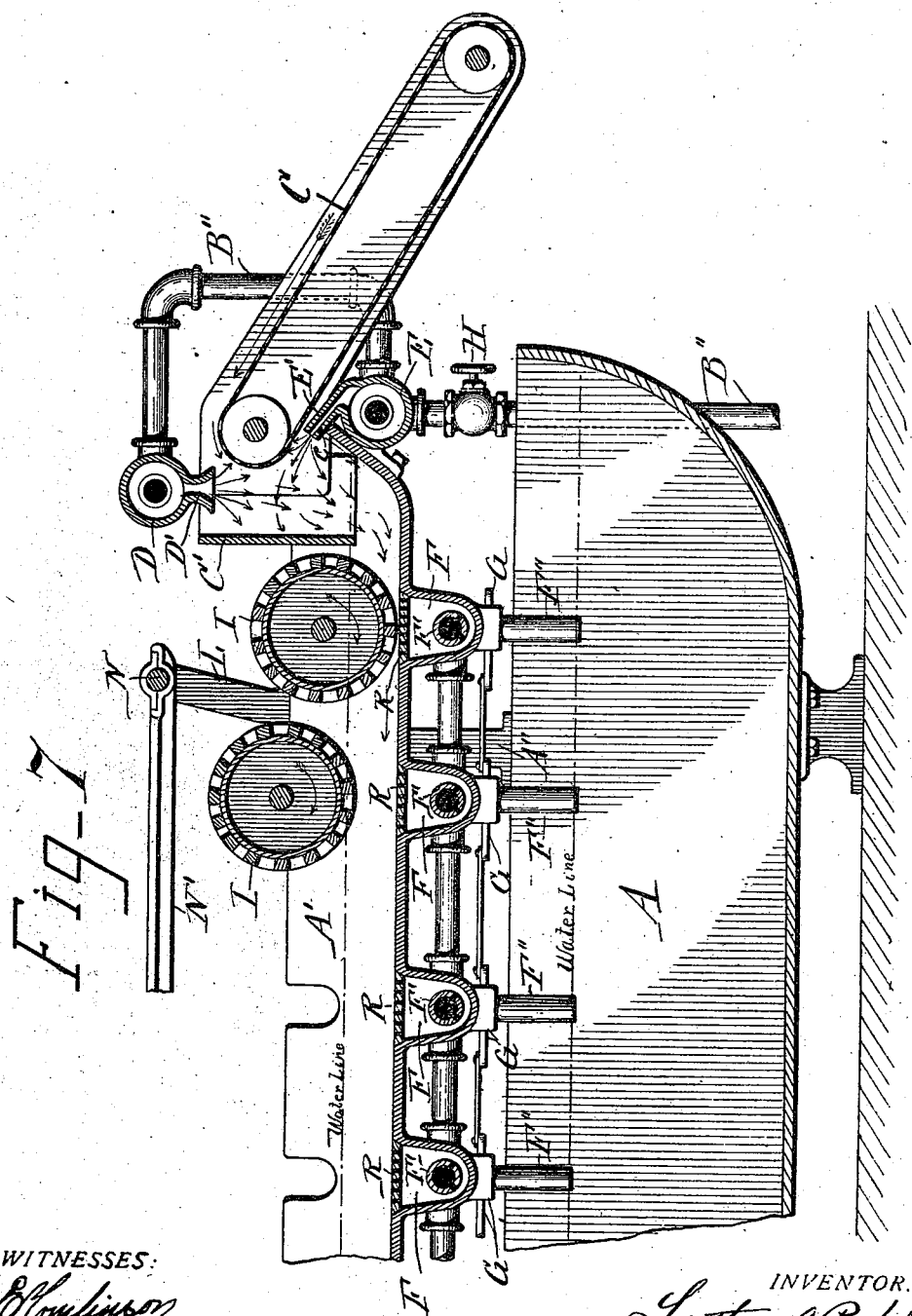
WITNESSES:
INVENTOR.
BY
ATTORNEY.

(No Model.) 15 Sheets—Sheet 8.

L. A. PECKHAM.
WOOL WASHING MACHINE.

No. 558,305. Patented Apr. 14, 1896.

WITNESSES:

INVENTOR.
Luther A. Peckham
BY E. Laass
his ATTORNEY.

(No Model.) 15 Sheets—Sheet 9.
L. A. PECKHAM.
WOOL WASHING MACHINE.
No. 558,305. Patented Apr. 14, 1896.
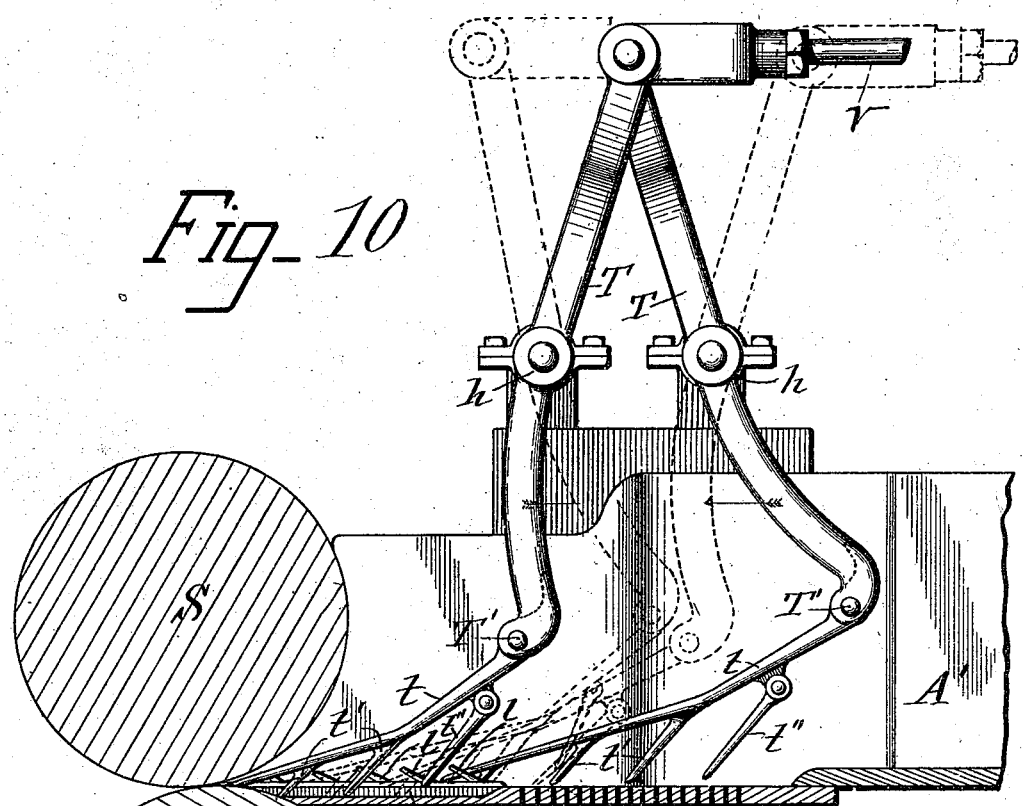
Fig. 10
Fig. 13
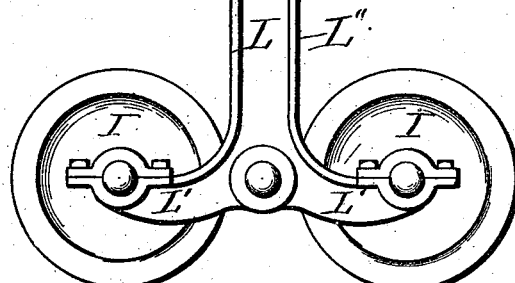
WITNESSES:
INVENTOR.
BY
his ATTORNEY.

(No Model.)  L. A. PECKHAM.  15 Sheets—Sheet 10.
WOOL WASHING MACHINE.

No. 558,305.  Patented Apr. 14, 1896.

WITNESSES:  
INVENTOR.  
Luther A. Peckham  
BY  
E. Laass  
his ATTORNEY.

(No Model.)
L. A. PECKHAM.
WOOL WASHING MACHINE.
No. 558,305.   Patented Apr. 14, 1896.
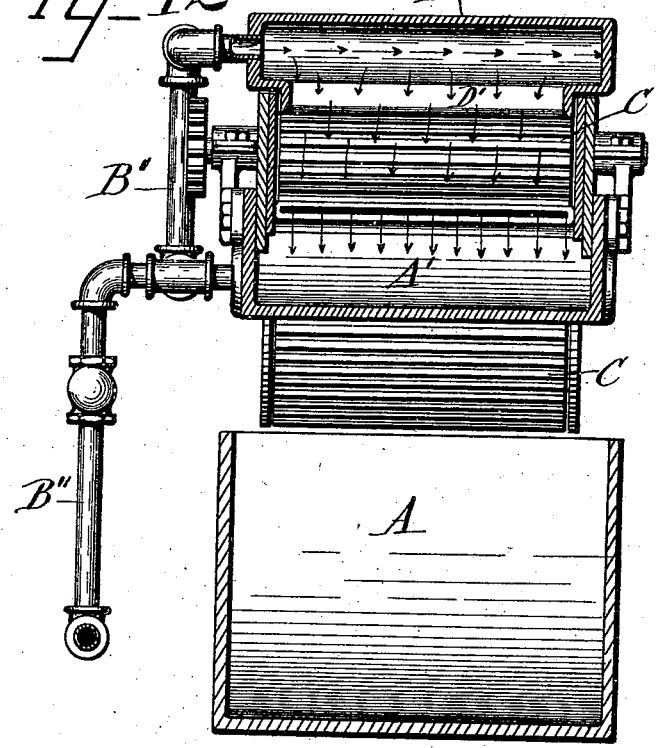
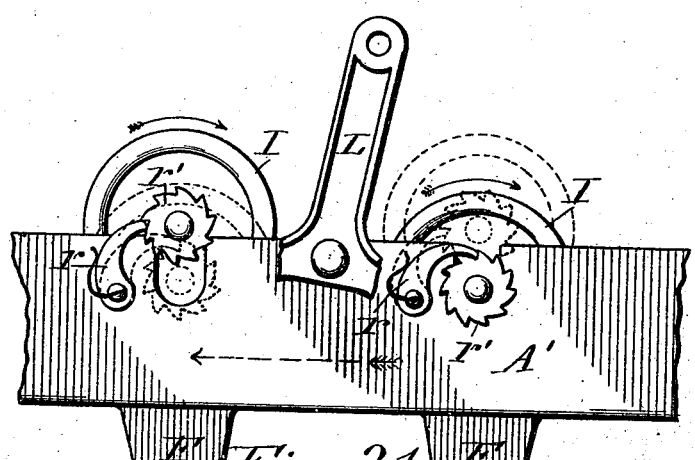
WITNESSES:
INVENTOR.
BY
his ATTORNEY.

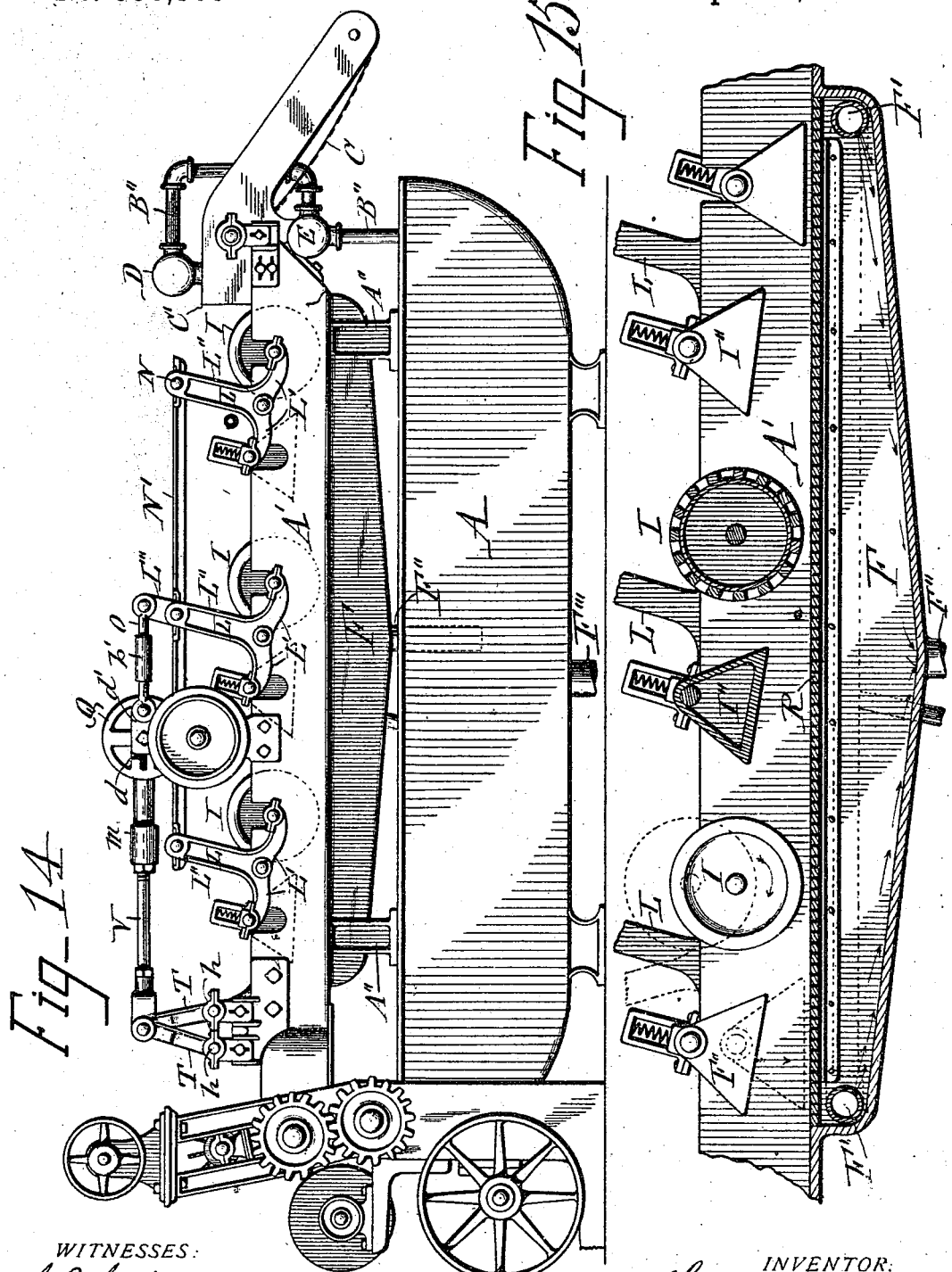

(No Model.) 15 Sheets—Sheet 13.

L. A. PECKHAM.
WOOL WASHING MACHINE.

No. 558,305. Patented Apr. 14, 1896.

WITNESSES:
C. E. Tomlinson
C. L. Bendixen

INVENTOR.
Luther A. Peckham
BY E. Lass
his ATTORNEY.

(No Model.) 15 Sheets—Sheet 14.
L. A. PECKHAM.
WOOL WASHING MACHINE.
No. 558,305. Patented Apr. 14, 1896.
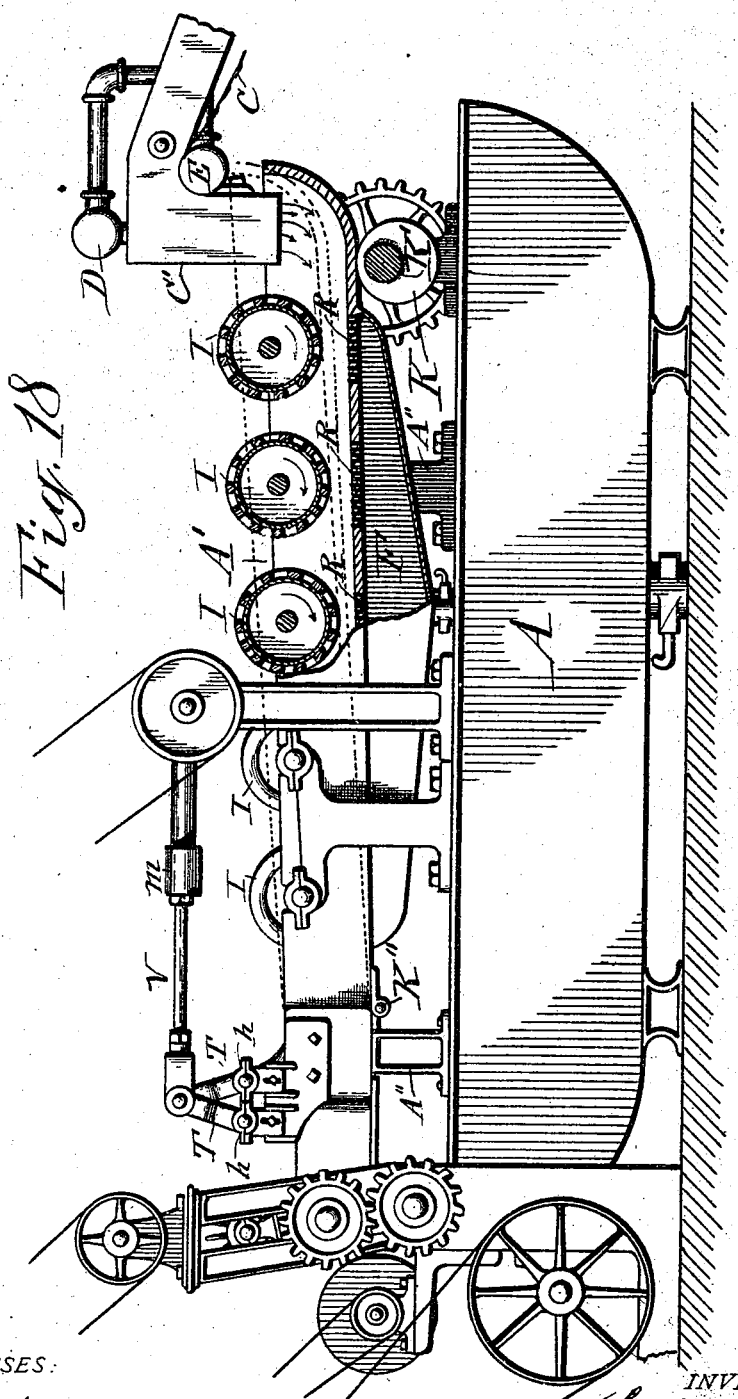
WITNESSES:
INVENTOR.
BY
his ATTORNEY.

(No Model.)

L. A. PECKHAM.
WOOL WASHING MACHINE.

No. 558,305.

15 Sheets—Sheet 15.

Patented Apr. 14, 1896.

WITNESSES:

INVENTOR.
BY Luther A. Peckham
E. Laass
his ATTORNEY.

UNITED STATES PATENT OFFICE.

LUTHER A. PECKHAM, OF OSWEGO FALLS, NEW YORK.

WOOL-WASHING MACHINE.

SPECIFICATION forming part of Letters Patent No. 558,305, dated April 14, 1896.

Application filed February 15, 1895. Serial No. 538,513. (No model.)

*To all whom it may concern:*

Be it known that I, LUTHER A. PECKHAM, of Oswego Falls, in the county of Oswego, in the State of New York, have invented new and useful Improvements in Wool-Washing Machines; of which the following, taken in connection with the accompanying drawings, is a full, clear, and exact description.

This invention consists in an improved organization of a machine designed for either washing or carbonizing wool and other loose fibers, which machine possesses superior efficiency in its operation combined with increased economy in the consumption of time in washing or treating the fibers and produces greatly-improved results.

The invention is fully illustrated in the annexed drawings, in which—

Figure 9:
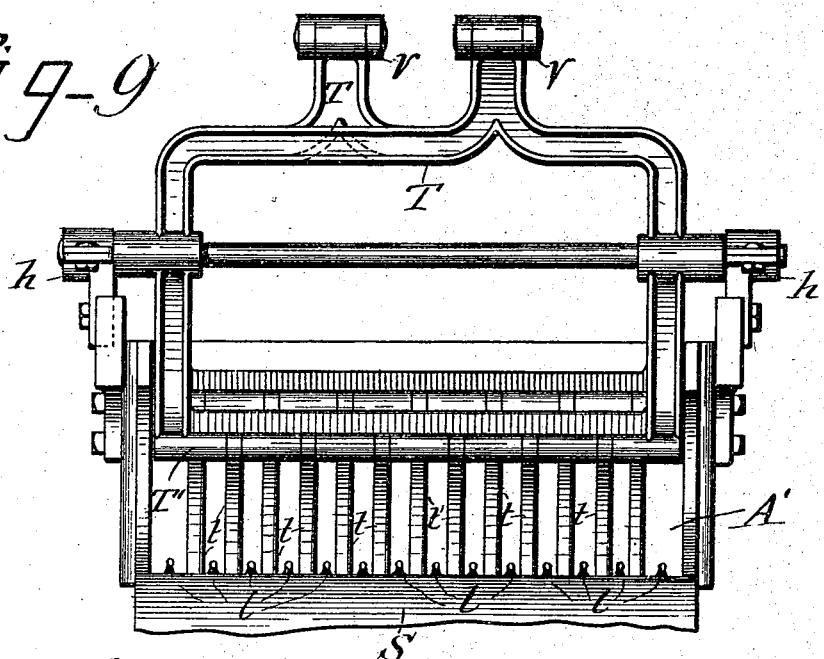
Figure 8:
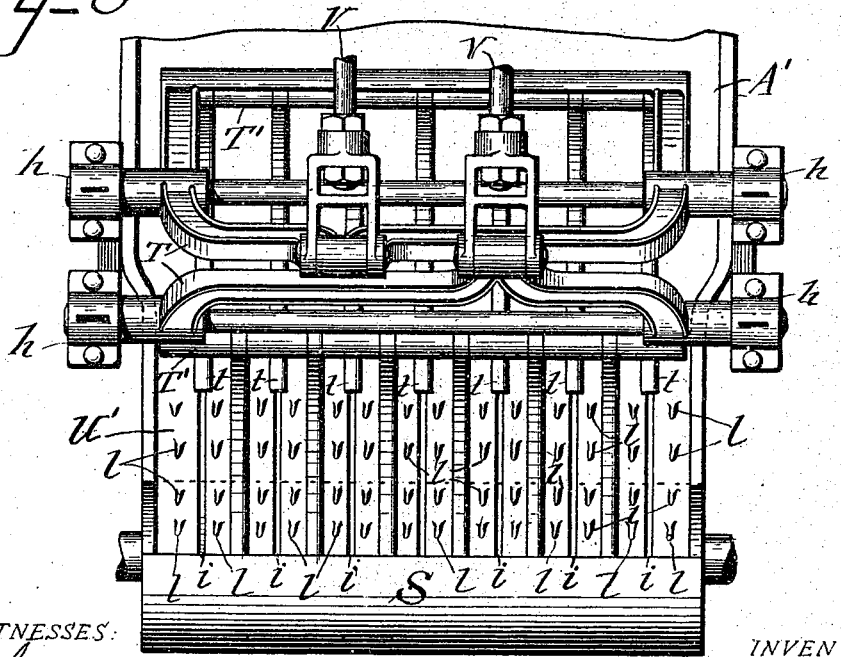
Figure 11:
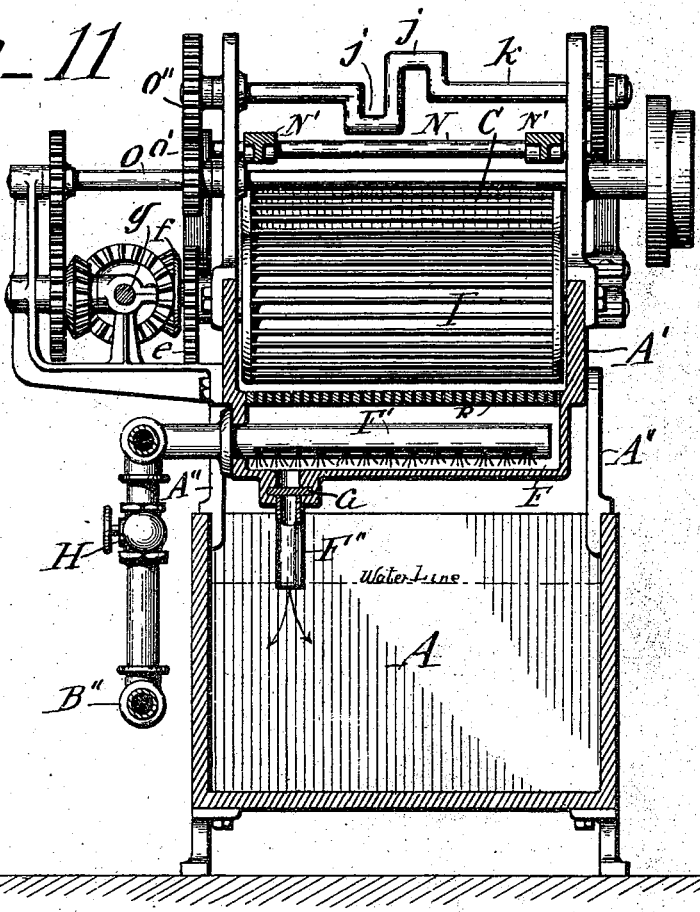
Figure 20:
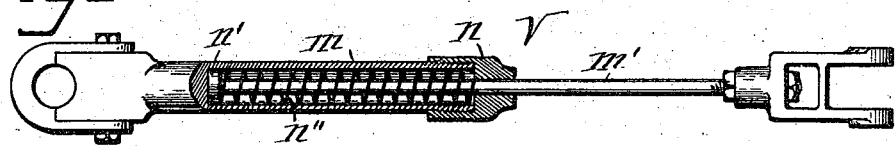
Figure 17:
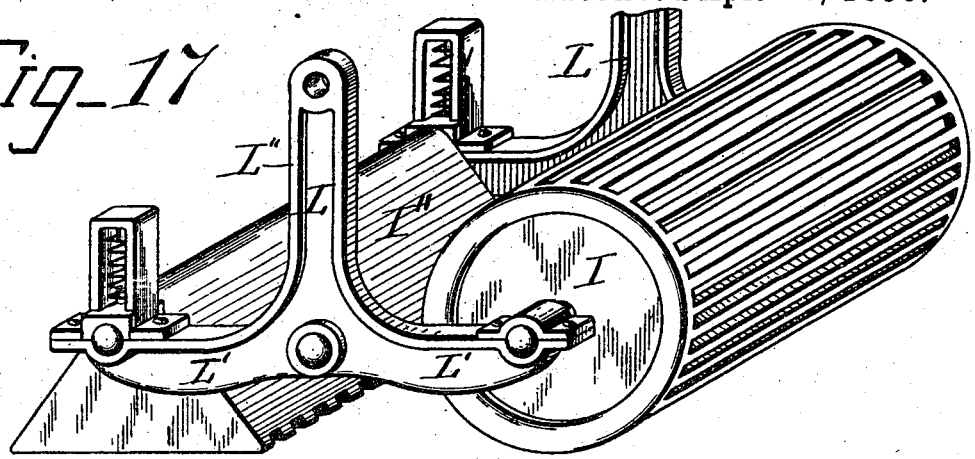
Figure 16:
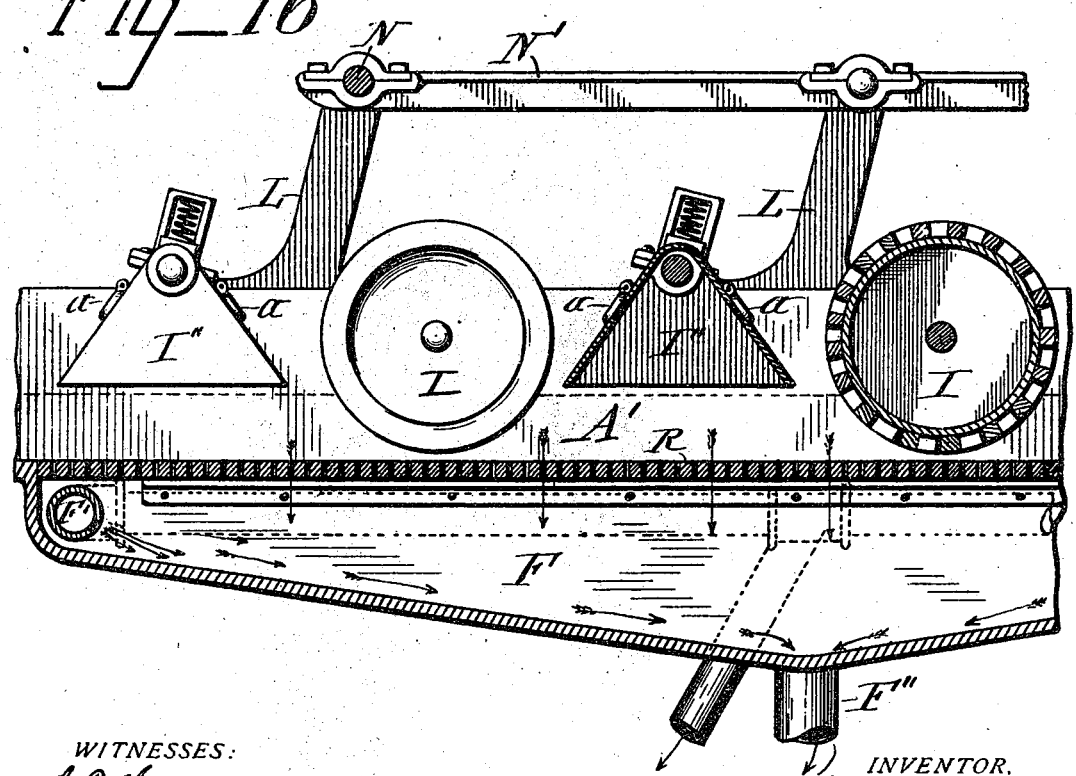
Figure 19:
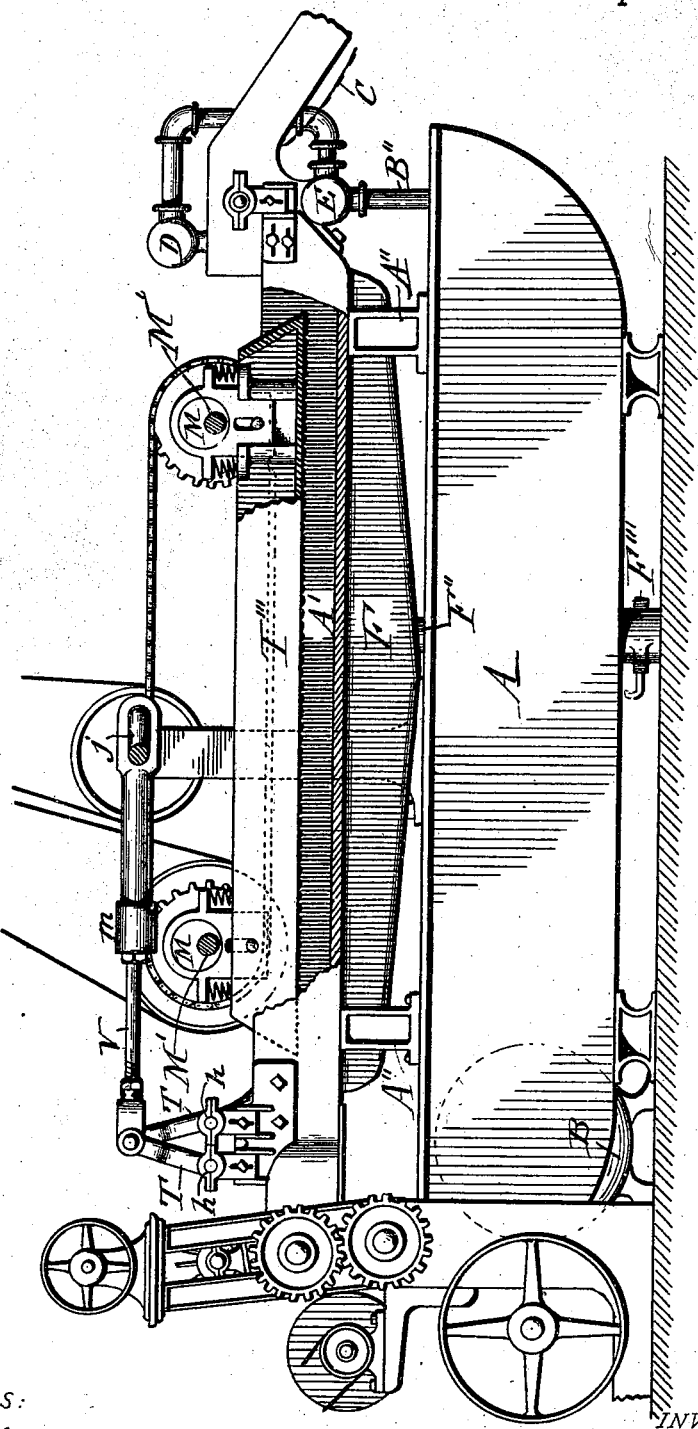

Figures 1 and 2 are elevations of opposite sides of a machine embodying my invention. Fig. 3 is a top plan view of the same. Fig. 4 is an enlarged plan view of a section of the washing-bowl proper, showing the same in its empty condition and with some of its component parts removed. Fig. 5 is an enlarged side elevation of one of the end portions of said machine. Fig. 6 is a vertical longitudinal section of one of the end portions of the machine, taken on line Y Y in Fig. 3. Fig. 7 is an enlarged vertical longitudinal section of the opposite end portion of the machine. Fig. 8 is an enlarged plan view of the end of the machine at which the washed fibers are delivered from the bowl. Fig. 9 is an elevation of the forks which deliver the washed fibers from the bowl, viewed from the end of the machine. Fig. 10 is an enlarged vertical longitudinal section of said forks, taken immediately inside of the side of the bowl. Figs. 11 and 12 are enlarged vertical transverse sections respectively on lines X X and Z Z in Fig. 1, viewed in the directions of the arrows thereat. Fig. 13 is an enlarged side view and partly a sectional view of the adjustable pitman, which transmits motion to the devices which squeeze the fibers within the bowl. Fig. 14 is a side elevation of a modification of my invention. Fig. 15 is an enlarged longitudinal section of the upper bowl of said modification. Fig. 16 is a further enlarged longitudinal vertical section of said modification. Fig. 17 is an enlarged detached perspective view of two forms of devices for squeezing the fibers within the liquid in the bowl. Figs. 18 and 19 illustrate further modifications of my invention, partly external views and partly sectional views. Fig. 20 is a longitudinal sectional view of one of the spring-coupled pitmen, and Fig. 21 illustrates a modification of the mechanisms for imparting rotary motion to the rollers employed for squeezing the wool or fiber in the suds or other liquid within the bowl.

Similar letters of reference indicate corresponding parts.

A represents the bowl, which constitutes the reservoir for the liquid in which the wool or other fiber is to be treated. Above this bowl I place another bowl A', which is separate and distinct from the lower bowl and constitutes the receptacle in which the fibers are either washed or carbonized. Inasmuch as the machine is chiefly designed for washing wool I will refer to said parts, respectively, as the "liquid-bowl" and the "washing-bowl" in my further description of the machine. Said upper or washing bowl is securely mounted on the lower bowl by standards A″ A″ and receives the suds or liquid from the lower bowl by means of a force-pump B, having its suction-pipe B' connected to the lower bowl at the fiber-discharge end of the machine, and the discharge-pipe B″, extending along the side of said bowl and up at the opposite end of the bowl in the manner hereinafter described.

C denotes the usual feed-apron by which the fibers are delivered to the upper or washing bowl A'. In order to cause the fibers to be effectually delivered from said apron and deposited in the adjacent end of the bowl, I place across the upper bowl in front of the delivery end of the apron C a vertically-disposed breast C', and place a pipe D parallel between said breast and feed-apron and above the latter, as shown more fully in Fig. 7 of the drawings. Said pipe is connected to the discharge-pipe B″ of the pump to receive the liquid therefrom and is provided with a downwardly-directed discharge-slot D', extending, preferably, throughout the entire width of the latter and having a flaring mouth to throw a downward stream of liquid between the breast C' and apron C and against said breast and apron and thereby wash the fibers from the discharge end of said apron and throw said fibers down into the bowl, as indicated by arrows in Fig. 7 of the drawings. I also connect to the discharge-pipe of the aforesaid pump another pipe E, which extends across the exterior of the end of the upper bowl beneath the return bottom portion of the apron C and is provided with a discharge-spout E', extending lengthwise of the pipe E and in an upward and inward direction into the bowl between the top of the latter and bottom of the apron, by means of which spout E' a stream of liquid is thrown against the bottom of the apron to cleanse the same from the fibers and throw them into the bowl. To prevent the fibers from adhering to the said end of the bowl, I provide the bottom of the spout E' with downwardly-directed perforations c, adjacent to the end of the inner side of the end wall of the bowl, so that the spray of liquid issuing from said perforations will cleanse said wall.

The washbowl A' is provided with one or more depending sand-traps F, separated from the lower bowl, each of said traps being covered by a perforated plate or strainer R, which allows the sand and grit to pass through it and into the trap wherein said substances are collected and thus retained separated from the liquid in the lower bowl. To allow said traps to be cleaned simultaneously with the cleaning of the lower bowl A, I connect to the pump-discharge pipe B'' branch pipes F', which extend into the said traps and have their inclosed portions perforated to throw sprays of liquid into the traps, as clearly shown in Fig. 11 of the drawings. Each trap has connected to it a discharge-pipe F''', which is provided with a gate or valve G, which is closed during the washing process. A valve H in the connection of the branch pipes with the pipe B'' is also to be closed during said process.

To allow the liquid from the pump-discharge pipe B'' to be conducted into the branch pipes F' when desired, I provide said discharge-pipe B'' with a valve or stop-cock H' beyond the connection of said branch pipes with the pipe B'', as shown in Fig. 2 of the drawings.

In cleaning out the machine the stop-cock of the usual outlet F'''' in the bottom of the bowl A is opened, and after closing the stop-cock H' the valves H and G are opened. The pump B being in operation causes the liquid to be forced into the branch pipes F', from whence it enters the traps and washes out the sand and grit which is allowed to escape through the discharge-pipes F''' into the lower bowl A.

If desired, a single sand-trap may be employed, as represented at F$^a$ in Figs. 14, 15, and 16 of the drawings, which trap extends nearly or quite the entire length of the upper bowl and has two branch pipes F$^{a'}$, extending into opposite ends thereof, the bottom of the trap being inclined from the ends to the center, where the discharge-pipe F$^{a''}$ is attached.

I employ devices for intermittently squeezing the wool upon the bottom of the bowl, so as to press the suds or liquid out of the wool and carry out with it the sand, grit, dirt, and grease. Said means of washing the wool may be constructed in various ways without departing from the spirit of my invention. The squeezers may be either of the form of rollers extending across the bowl A', as represented at I, or consist of boxes I' placed inverted over the bottom of the bowl and provided with outwardly-opening valves a for the escape of the air displaced in the boxes during the operation of submerging them in the liquids, or said boxes may be permanently closed, as shown at I'', and, furthermore, the squeezer may extend the entire length of the bowl, as shown at I''' in Fig. 19 of the drawings. The squeezing may be effected either by causing the aforesaid squeezers to move toward and from the bottom of the bowl, as shown in the majority of the figures in the drawings, or by causing the washing-bowl to rock vertically, the latter construction being represented in Fig. 18, in which the bowl is designated A$^a$. The latter motion may be produced by an eccentric K, attached to a rotary shaft K' and carrying upon its periphery one end of the bowl which is hinged at its opposite end, as shown at K''; but inasmuch as it requires considerable power to impart said motion to the bowl I prefer to secure the same permanently in a horizontal or nearly horizontal position and employ suitable means for moving the before-described squeezers toward and from the bottom of the bowl. This may be accomplished either by oscillatory levers L L at opposite sides of the bowl and having two arms L' L', fulcrumed on the axes of a pair of the squeezers, or, when the squeezer extends nearly the entire length of the bowl, said squeezer may be caused to receive its vertical motion by hanging it on eccentrics M, fastened to rotary shafts M' over opposite ends of the squeezer, as represented in Fig. 19 of the drawings. I prefer, however, to employ the levers L L, which are each provided with an upwardly-extending arm L'' and two arms L' L', extending laterally in opposite directions from the lower end of the arm L'', and preferably fulcrum said lever on the axes of two rollers I I, which are pivoted to the ends of said arms. By oscillating said levers in planes at right angles to the axes of the rollers one of said rollers is lifted by one arm of each lever, while the other arm presses down the other roller and is fulcrumed thereon, and said motion of the rollers is reversed during each stroke of the levers. The levers of each pair of rollers are united by a cross-bar N to compel the two levers to move in unison.

I prefer to employ a plurality of squeezing-rollers I I, arranged in pairs, each of which pairs is connected to a pair of levers L, united as aforesaid, and in order to operate all of said rollers in unison I couple together the cross-bars N N by longitudinal rods N'. One of the levers L has its third or upwardly-projecting arm L" provided with an extension L'", which, by a pitman O, is connected to a wrist-pin P on a rotary wheel Q, which when in motion imparts a rocking motion to the levers L by means of the pitman.

In order to guard against undue strain on the levers and their connections, incident to an uneven distribution of the wool in the bowl, I form the pitman with a longitudinally-yielding joint obtained by forming the pitman of two sections connected end to end by spiral spring $b$ in a sleeve $b'$, inclosing the adjacent ends of the pitman-sections and bearing against collars $b''$ on the ends of said sections, as illustrated in Fig. 13 of the drawings.

I also provide means for varying the degree of the lifting of the rollers I I by providing the wheel Q with a diametric slot $d$ for the reception of the bolt by which to clamp on said wheel a block $d'$, which has attached to it the wrist-pin to which the pitman O is connected. Said slot allows the wrist-pin to be set either in the center of the wheel or any desired distance therefrom.

In order to impart to the rollers I I a rotary motion so as to cause the wool to be moved toward the discharge end of the bowl, I attach to the axes of said rollers, at one side of the bowl, gear-wheels $e$ $e$ and fasten to the same side of the bowl gudgeons upon which are mounted intermediate pinions $e'$, meshing with the gear-wheels of a pair of rollers I I. To the same gudgeons are fastened beveled gears $f$, meshing with beveled pinion $f'$ attached to a rotary shaft $g$, which extends along the side of the bowl, as more clearly shown in Fig. 3 of the drawings. The means for transmitting motion to the shaft $g$ may be varied in numerous ways, and I therefore do not limit myself in this respect.

S S represent the squeeze-rolls, which extend across the discharge end of the bowl to express the liquid from the washed wool. These rolls I prefer to arrange with their bite nearly or quite in line with the bottom of the interior of the bowl A', as shown in Figs. 6 and 10 of the drawings.

For delivering the washed wool to the rolls S S, I have devised oscillatory forks, which are pivoted one in rear of the other but operate through parallel paths, and each delivers the washed fibers to the rolls without assistance from the other, instead of employing two or more rakes or forks delivering the washed fiber one to another, as heretofore proposed. Each of these forks extends across the bowl and consists of a frame T, pivoted in suitable bearings $h$ $h$, secured to the sides of the bowl. Said frame is thus allowed to swing in an arc toward and from the squeeze-rolls S S or discharge end of the bowl. To a horizontal cross-bar T' on the lower end of the frame T are pivoted the tines $t$ $t$, which are of such length as to cause them to be inclined toward the rolls S S by the free ends of the tines sliding on a metal plate hereinafter described. It will be observed that each fork travels up to the delivery end of the bowl and thereby delivers the washed fiber to the squeeze-rolls S S without assistance from the other forks. I preferably form said tines with auxiliary teeth $t'$, projecting from the bottom of the tines, and also hinge to the rear portion of the main tine a supplemental tine $t''$.

That portion of the bottom of the bowl which is under the aforesaid forks is formed of a metal plate U, which extends to the squeeze-rolls S S, and adjacent to said rolls is another plate U', which is countersunk in the top of the plate U. Back of the plate U' the plate U is perforated and forms the sole outlet of the suds or liquid from the washing-bowl A' to the lower bowl or reservoir A.

To properly guide the free ends of the tines and to enable them to obtain effective hold upon the wool, I provide the top of the plate U' with longitudinal grooves $i$ $i$, in which the tines slide, as more clearly seen in Fig. 8 of the drawings, and also provide said plate with rows of teeth $l$ $l$ between the grooves, which teeth stand with their free ends pointing toward the bite of the squeeze-rolls S S.

The tines of each fork are arranged intermediate those of the other, and the two forks are oscillated so as to cause one fork to recede from the rolls S S while the other fork pushes the washed fiber toward said rolls.

The teeth $l$ $l$ on the plate U' prevent the fiber from being drawn back by the receding fork.

The aforesaid motion of the forks is derived from pitmen V V, connected to two cranks $j$ $j$, which extend in opposite directions from their axes and are preferably on the same shaft $k$ which receives rotary motion from the driving-shaft $o$ by intermeshing gears $o'$ $o''$. I do not, however, limit myself to this particular mechanism for actuating the aforesaid crank-shaft, as the same may be effected by other suitable means.

In order to guard against undue strain on the forks and their connections incident to the tines of said forks engaging an excessive amount of fiber, I provide the pitmen V V with suitable spring-couplings, which allow said pitmen to yield longitudinally when subjected to excessive strain. One form of said spring-couplings is illustrated in Fig. 20 of the drawings, and consists of the sleeve $m$, forming one end portion of the pitman and receiving in it a portion of a rod $m'$, which constitutes the other end portion of the pitman. Said rod passes through a cap $n$, secured to the end of the sleeve, and the inner end of the rod has affixed to it a head $n'$, between which and the cap $n$ is a compressed spiral spring $n''$, surrounding the rod $m'$.

Another salient feature of my invention resides in the screen or strainer J in the end of the lower bowl A, directly under the plate U, which is provided with the sole outlet for the liquid from the upper bowl to the lower bowl. This strainer extends across the bowl and to the top thereof and under the lower squeeze-roll S, as shown in Fig. 6 of the drawings. This strainer serves to collect all the fine fibers which may escape from the upper bowl. To carry these fine fibers back to the upper bowl A', I connect the suction-pipe B' of the pump B to the lower bowl A at a point to communicate with the interior of the aforesaid strainer J, preferably near the base thereof, and thus convey said fibers with the liquid to the bowl A'. By this means I effectually prevent the waste of said fibers.

One of the means of imparting rotary motion to the rollers I I is shown in Fig. 21 of the drawings, and consists of pawls or dogs r, mounted on the bowl A' and engaging ratchets r' on the ends of the rolls I I during the descent of the latter.

Having described my invention, what I claim is—

1. In a machine for washing or carbonizing wool or other fibers, the combination of two bowls arranged one above the other, a strainer in the bottom of the upper bowl, means for causing the fiber to be squeezed against said strainer, a valved sand-trap depending from said strainer, a pump for forcing liquid from the lower into the upper bowl, and a valved pipe communicating with said pump and sand-trap for flushing the latter, substantially as described.

2. The combination with the washing-bowl of a wool washing or carbonizing machine, of a strainer in the bottom thereof, a sand-trap depending from said strainer, a valve for said sand-trap, a pump for supplying the washing-bowl with liquid, a branch pipe communicating with said sand-trap and pump, and valves controlling the supply of liquid respectively to the bowl and sand-trap, substantially as described.

3. In a machine for washing or carbonizing wool or other fibers, the combination with the two bowls arranged one above the other, a sand-trap depending from the upper bowl, and a discharge-pipe attached to said trap and provided with a valve, of a pump for forcing the liquid from the lower into the upper bowl, and a valved pipe communicating with said pump and sand-trap for flushing the latter, substantially as described.

4. The combination with a fiber-washing bowl, of fiber-squeezers therein, rocking levers supporting said squeezers, a pitman connected with said levers, a wheel having a diametrical slot, a block to which said pitman is secured, and means passing within said slot for securing said block adjustably to said wheel, for the purpose specified.

5. The combination with the washbowl, of a sand-trap depending from said bowl, a discharge-pipe attached to said trap, a valve connected to said pipe, and a liquid-conveying pipe extending through the trap and perforated to discharge liquid in the trap substantially as and for the purpose set forth.

6. A wool or fiber washing machine comprising two separate and distinct bowls disposed one above the other, sand-traps connected to the upper bowl and provided with valved discharge-pipes, agitators in said bowl, a force-pump having its suction-pipe connected to the lower bowl, the discharge-pipe of said pump communicating with the upper bowl, branch pipes extending from said discharge-pipe into the sand-traps, and valves controlling the flows of liquid respectively to the bowl and to the aforesaid branch pipes as set forth.

7. In a machine for washing or carbonizing wool or other fibers, the combination with the washing-bowl having a plurality of strainers in its bottom, vertically-movable squeezers operating therein to squeeze the fibers against said strainers, and a valved sand-trap depending from each of said strainers, of a lower bowl, a pump for forcing liquid from said lower bowl into the washbowl, branch pipes extending into said sand-traps and communicating with the pump, and valves controlling the flow of liquid respectively to the washing-bowl and to the branch pipes, substantially as set forth.

8. In a fiber-washing machine, the combination of two separate bowls disposed one above the other, sand-traps depending from the upper bowl and provided with valved discharge-pipes, strainers over said traps, fiber-squeezers over the strainers, a force-pump having its suction-pipe connected to the lower bowl, the discharge-pipe of said pump communicating with the upper bowl, branch pipes extending from said discharge-pipe into the sand-traps and perforated therein, and valves controlling the flows of liquid respectively to the upper bowl and to the branch pipes as set forth.

9. The combination with the fiber-washing bowl, and levers movable toward and from the bottom thereof, of fiber-squeezers supported by said levers and movable therewith, means for operating said levers, and means for rotating said squeezers.

10. The combination with two separate bowls disposed one above the other, sand-traps connected with the bottom of the upper bowl, and strainers over said traps, of levers movable toward and from said strainers, rollers supported by said levers, and movable therewith, and means for rotating said rollers.

11. The combination with a journaled squeezer-roll, a washing-bowl, and means for moving said roll toward and from the bottom of said washing-bowl, of gearing for imparting rotary motion to said squeezer-roll, substantially as described.

12. The combination with the fiber-washing bowl, of vertically-movable rollers extending across said bowl and intermittently squeezing the fibers upon the bottom of the bowl, means for moving said rolls toward and from the bottom of the bowl, and mechanism imparting rotary motion to said rollers, as set forth.

13. The combination of two separate bowls disposed one above the other, and a pump forcing the liquid from the lower to the upper bowl, sand-traps connected to the bottom of the upper bowl, vertically-movable rollers disposed axially across the upper bowl and intermittently squeezing the fibers upon the bottom of said bowl, means for moving said rolls toward and from the bottom of the bowl and mechanism imparting rotary motion to said rollers as set forth.

14. In combination with the fiber-washing bowl, three-armed levers at opposite sides of the bowl, rollers extending across said bowl and pivoted to two of the arms of each lever, a rod connecting the two levers at the third arms thereof, mechanism imparting to said levers a rocking motion in a plane at right angles to the axes of the rollers, and mechanism imparting rotary motion to the rollers whereby the lowered roller will both squeeze the fiber and feed it to beneath the adjacent raised roller, as set forth.

15. The combination with the fiber-washing bowl, of fiber-squeezers movable toward and from the bottom thereof, means for operating said squeezers alternately in opposite directions, and mechanism for rotating said squeezers to cause them to also feed the fiber forward, substantially as described.

16. The combination with the fiber-washing bowl, of a plurality of three-armed levers arranged in pairs at opposite sides of the bowl, rollers extending across the bowl and each pivoted to corresponding arms of a pair of levers, rods connecting each pair of levers at the third arms thereof, a longitudinal rod coupling together said connecting-rods, mechanism imparting reciprocating motion to said longitudinal rod, gears attached to corresponding ends of the rollers, and intermediate rotary pinions meshing with the gears as set forth.

17. In combination with the fiber-washing bowl, of a plurality of three-armed levers arranged in pairs at opposite sides of said bowl, fiber-squeezers extending across the bowl and each pivoted to corresponding arms of a pair of levers, rods connecting each pair of levers at the third arms thereof, a longitudinal rod coupling together said connecting-rods, and a reciprocating pitman imparting motion to said longitudinal rod and composed of sections connected end to end by a spiral-spring coupling to compensate for the inequality of the movement of the squeezers due to unequal distribution of the fibers in the bowl as set forth.

18. The combination, with the fiber-washing bowl, of a plurality of rollers extending across said bowl and arranged in pairs, three-armed levers at opposite sides of the bowl and each pivoted at the junction of its several arms, cross-rods connecting the levers of each pair of rollers at the third arms thereof, a longitudinal rod coupling together the cross-rods, a reciprocating pitman moving with it the said longitudinal rod, gears attached to the axes of the rollers, intermediate pinions pivoted to the side of the bowl and meshing with said gears, a rotary shaft extending along the side of the bowl, and bevel-gears transmitting motion from said shaft to the aforesaid pinions as set forth.

19. The combination with the fiber-washing bowl, of rollers extending across said bowl, three-armed levers at opposite sides of the bowl and each pivoted at the junction of its several arms, a cross-rod connecting said levers at the third arms thereof, a rotary wheel, a wrist-pin connected to said wheel adjustably toward and from the center thereof, and a pitman connecting said wrist-pin to the aforesaid cross-rod as set forth.

20. In combination with the fiber-washing bowl, a plurality of rollers extending across the bowl and arranged in pairs, three-armed levers at opposite sides of the bowl and each pivoted at the junction of its several arms, cross-rods connecting the levers of each pair of rollers at the third arms thereof, a longitudinal rod coupling together said cross-rods, a rotary wheel, a wrist-pin connected to said wheel adjustably toward and from the center thereof, a pitman connecting said wrist-pin to one of the aforesaid cross-rods, gears attached to the axes of the rollers, intermediate pinions pivoted to the side of the bowl, a rotary shaft extending along the side of the bowl, and beveled gears transmitting motion from said longitudinal shaft to the aforesaid intermediate pinions as set forth.

21. The combination with the fiber-washing bowl, of an endless apron for delivering the fiber to said bowl, a transverse breast in front of the delivery end of said apron, a transverse pipe beneath said apron, said pipe having a nozzle which discharges upwardly and inwardly against the fiber on the under side of the delivery end of said apron and is formed with downwardly-directed supplemental openings discharging adjacent to the inner side of the end wall of the bowl, and a pump for forcing fluid into said pipe.

22. The combination with the fiber-washing bowl, having a transverse breast near its receiving end, and an endless apron for delivering the fiber to the space between said breast and receiving end of the bowl, of a transverse pipe, having a discharge-slot arranged to wash fiber off the delivery end of the apron and to force the fiber into the bowl and beneath said breast, a transverse pipe having a discharge-nozzle arranged to wash fiber off the under side of the apron, said discharge-nozzle having supplemental discharge-openings in its under side, and a pump for forcing fluid through said pipe.

23. The combination with the fiber-washing bowl, and the plates secured near the delivery end thereof and formed with parallel grooves and with rows of teeth between said grooves, said teeth projecting toward the delivery end of the bowl, of oscillatory forks for delivering the washed fiber to said delivery end of the bowl, said forks being pivoted one in rear of the other and traversing respective grooves in the plate and each delivering the fiber to the delivery end of the bowl without assistance from the other, and means for causing one fork to approach said delivery end of the bowl while the other recedes therefrom.

24. The combination with the fiber-washing bowl, and the plates secured near the delivery end thereof and formed with grooves and with rows of teeth between said grooves, said teeth projecting toward said delivery end of the bowl, of frames inclined in opposite directions and each pivoted intermediate its length and one in rear of the other, main tines pivoted to the lower ends of said frames and extending incliningly downward therefrom, the rear tine being of greater length than the forward tine and carrying the fiber to the delivery end of the bowl independent of the same, supplemental teeth projecting from said tines, said tines and teeth traversing said grooves in the plates, and means for causing one tine to approach said delivery end of the bowl while the other recedes therefrom.

25. The combination with the washbowl, of frames inclined in opposite directions and each pivoted intermediate its length and one in rear of the other, and downwardly and forwardly extending forks pivoted to the lower ends of said frames, the rear fork being of greater length than the other so as to deliver the fiber to the delivery end of the washbowl without assistance from the other fork, substantially as described.

26. The combination with the washbowl, of oscillatory frames, inclined in opposite directions and each pivoted intermediate its length and one in rear of the other, main tines pivoted to the lower ends of said frames and extending incliningly downward therefrom, the rear tine being of greater length than the forward tine, each of said tines being formed with rigid depending supplemental teeth and with depending pivoted teeth, substantially as described.

27. The combination with the washbowl, of oscillatory forks therein for delivering the washed fiber to the delivery end of the bowl, said forks being pivoted one in rear of the other and traversing parallel paths and each delivering the fiber to the delivery end of the bowl without assistance from the other, and means for causing one fork to approach the delivery end of the bowl while the other recedes therefrom.

28. In combination with the bowl, a plurality of forks pivoted to swing in arcs toward and from the delivery end of the bowl, a corresponding number of rotary cranks standing at an angle in relation to each other, and separate pitmen connecting the forks to the respective cranks, each of said pitmen being provided with a longitudinal spring-coupling to compensate for varying strains exerted on the forks as set forth.

In testimony whereof I have hereunto signed my name this 17th day of January, 1895.

LUTHER A. PECKHAM. [L. S.]

Witnesses:
WILLIAM KÖEHLER,
C. L. BENDIXON.